United States Patent
Link et al.

(10) Patent No.: US 7,706,262 B2
(45) Date of Patent: Apr. 27, 2010

(54) IDENTIFYING DATA AND/OR CONTROL PACKETS IN WIRELESS COMMUNICATION

(75) Inventors: Michael Link, Neunkirchen am Brand (DE); Mirko Schacht, Allersberg (DE); Sudeep Kumar Palat, Swindon (GB); Said Tatesh, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 798 days.

(21) Appl. No.: 11/241,262

(22) Filed: Sep. 30, 2005

(65) Prior Publication Data

US 2007/0076707 A1 Apr. 5, 2007

(51) Int. Cl.
*G01R 31/08* (2006.01)
*H04J 3/24* (2006.01)
*H04J 1/02* (2006.01)
*H04L 12/28* (2006.01)

(52) U.S. Cl. ............... 370/230; 370/349; 370/389; 370/497

(58) Field of Classification Search ............ None
See application file for complete search history.

(56) References Cited

U.S. PATENT DOCUMENTS

| | | | | |
|---|---|---|---|---|
| 2002/0114274 | A1* | 8/2002 | Sturges et al. | 370/229 |
| 2003/0156578 | A1 | 8/2003 | Bergenlid et al. | 370/352 |
| 2003/0169771 | A1* | 9/2003 | Ahn et al. | 370/497 |
| 2003/0200342 | A1* | 10/2003 | Greenblat et al. | 709/251 |
| 2003/0214913 | A1* | 11/2003 | Kan et al. | 370/252 |
| 2004/0120345 | A1* | 6/2004 | Yamaguchi et al. | 370/465 |
| 2004/0160938 | A1* | 8/2004 | Lee et al. | 370/349 |
| 2004/0213152 | A1* | 10/2004 | Matuoka et al. | 370/230 |
| 2005/0201366 | A1* | 9/2005 | Kim et al. | 370/353 |
| 2006/0050705 | A1* | 3/2006 | Kim | 370/392 |
| 2006/0256721 | A1* | 11/2006 | Yarlagadda et al. | 370/235 |

FOREIGN PATENT DOCUMENTS

WO   WO 01/78430 A1   10/2001
WO   WO 2004 091140 A2   10/2004

OTHER PUBLICATIONS

3GPP TR 25.862: "RAB Support for IMS," v. 1.1.0., source:3GPP RAN2 (Jun. 2005).
R2-042288, (S2-043414, to RAN2). Reply LS (to R2-041900) on Optimisation of Voice over IMS, SA WG2 (Nov. 16-19, 2004).
R2-042429 (S4-040632, to RAN2). Reply LS (to R2-041900) on Optimisation of Voice over IMS SA WG4 (Nov. 15-19, 2004).
3GPP Tdoc R2-032142: "Handling of variable data rates for conversational IMS," source: Siemens (Oct. 6-10, 2003).
3GPP Tdoc R2-042388: "RAB configurations for VoIMS", source: Samsung (Nov. 15-19, 2004).
International European Search Report EP 05 25 7620 dated Mar. 15, 2006.
3GPP TR 25.862 v1.2.0 Technical Specification Group Radio Access Network; RAB Support for IMS, Release 6, Aug. 2004.

* cited by examiner

*Primary Examiner*—Huy D Vu
*Assistant Examiner*—Brandon Renner
(74) *Attorney, Agent, or Firm*—Williams, Morgan & Amerson, PC

(57) ABSTRACT

The present invention provides a method of wireless communication. The method includes determining whether a packet includes a voice payload or control information based on at least one property of the packet.

14 Claims, 4 Drawing Sheets

IDENTIFYING DATA AND/OR CONTROL PACKETS IN WIRELESS COMMUNICATION

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as access points or node-Bs or access networks, for providing wireless connectivity to one or more mobile units, which may also be referred to using terms such as user equipment, subscriber equipment, and access terminals. Exemplary mobile units include cellular telephones, personal data assistants, smart phones, text messaging devices, laptop/notebook computers, desktop computers, and the like. Each base station may provide wireless connectivity to one or more mobile units, such as the mobile units in a geographical area, or cell, associated with the base station. For example, a base station may provide wireless connectivity to mobile units located in a cell according to a Universal Mobile Telecommunication System (UMTS) protocol. Alternatively, the base station may provide wireless connectivity to mobile units located in the cell according to a CDMA protocol, an IEEE 802.11 protocol, an IEEE 802.16 protocol, an IEEE 802.20 protocol, a Bluetooth protocol, and or other protocols.

In operation, each mobile unit maintains a wireless communication link, or leg, with one or more base stations. The wireless communication link typically includes one or more uplink and/or downlink channels for transmitting data and control information. Speech traffic is conventionally transmitted over the wireless communication link using circuit-switched radio bearers so that a permanent connection exists between the mobile unit and the base station and/or radio access network. However, procedures to improve the efficiency of the usage of scarce radio resources are being implemented in advanced speech coding schemes, such as Adaptive Multi-Rate (AMR) techniques. Channelization codes that are used to define the uplink and/or downlink channels are among the most restrictive resources in a wireless telecommunication System. For example, in UMTS systems, the channelization codes may be Walsh codes with a spreading factor of 128, in which case at most 128 concurrent connections can be supported by a single base station in one cell. Furthermore, in real systems the number of concurrent connections is typically reduced by interference limits, soft handover overhead, and the like.

Voice over Internet Protocol (VoIP) systems transmit data and/or control information using a packet-switched network, such as the Internet. In VoIP systems, speech data frames are embedded into Internet Protocol data frames. Two different types of packets are typically transmitted: Real Time Protocol (RTP) packets that carry the voice payload and Real Time Control Protocol (RTCP) packets that carry control information such as synchronization information, information that may be used for conference calls between multiple parties, and the like. Although the RTP packets and the RTCP packets may be multiplexed at the Internet Protocol level, the quality-of-service requirements of the two types of packets are different. The RTP packets are subject to relatively stringent delay constraints (i.e., they are delay-intolerant) but they are relatively tolerant to loss. In contrast, the RTCP packets are delay tolerant but are very sensitive to loss. Furthermore, the RTP packets are generally transmitted frequently and/or periodically and have predictable sizes, whereas the RTCP packets may be transmitted occasionally and/or sporadically but they have larger and/or varying sizes.

The Third Generation Partnership Project (3GPP) has attempted to define mechanisms that may be used to distinguish between the RTP and RTCP packet flows so that the two packet flows may be assigned to different radio bearers that take into account their different properties. In particular, different operational modes of the Radio Link Control (RLC) protocol layer may be used: Unacknowledged Mode (UM) RLC, which provides low delay jitter at the cost of increased residual packet loss rate may be used for the RTP flow, and Acknowledged Mode (AM) RLC, which provides lower residual packet loss rates at the cost of higher delay jitter may be used for the RTCP flow. However, no acceptable technique for distinguishing between the two packet flows has yet been proposed. Two proposed mechanisms for distinguishing between the RTP and RTCP packet flows—completely removing RTCP packets and using User Datagram Protocol (UDP) port numbers or packet-type header fields to distinguish between the flows—are considered unreliable and have been rejected by the 3GPP.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for wireless communication. The method includes determining whether a packet includes a voice payload or control information based on at least one property of the packet.

BRIEF DESCRIPTION OF THE DRAWINGS

The invention may be understood by reference to the following description taken in conjunction with the accompanying drawings, in which like reference numerals identify like elements, and in which.

Figure 1:
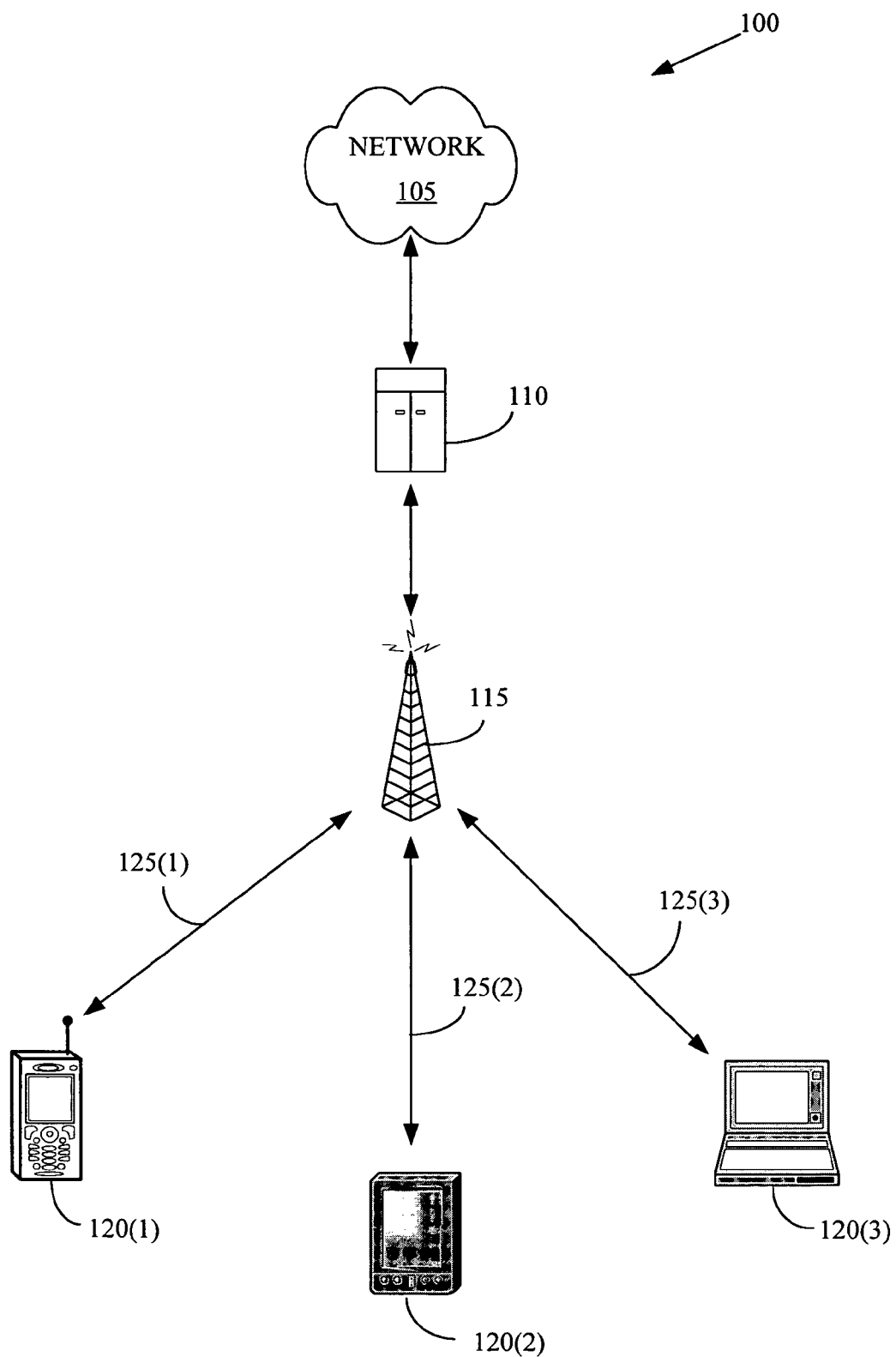
FIG. 1 shows one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, ie., a meaning other than that understood by skilled artisans, such a special definition will be expressly set forth in the specification in a definitional manner that directly and unequivocally provides the special definition for the term or phrase.

Referring now to FIG. 1, one exemplary embodiment of a communication system 100 is shown. In the illustrated embodiment, the communication system 100 includes a network 105 that is communicatively coupled to a network controller 110. Although a single network controller 110 is shown in FIG. 1, persons of ordinary skill in the art having benefit of the present disclosure should appreciate that any number of network controllers 110 may be communicatively coupled to the network 105. In the illustrated embodiment, the communication system 100 operates according to a Universal Mobile Telecommunication Systems (UMTS) protocol. Accordingly, the network 105 may also be referred to as the core network 105 and the network controller 110 may be a Radio Network Controller (RNC) 110. However, persons of ordinary skill in the art should appreciate that the present invention is not limited to communication systems 100 that operate according to the UMTS protocol. In alternative embodiments, the communication system 100 may operate according to protocols such as a Global System for Mobile communications (GSM) protocol, a Code Division Multiple Access (CDMA or CDMA 2000) protocol, a 3G1X-EVDO protocol, a protocol based on one or more of the IEEE 802 standards, a Bluetooth protocol, and the like. Furthermore, the network 105 and/or the network controller 110 may, in alternative embodiments, include wired connections that operate according to one or more wired communication systems.

The network controller 110 is communicatively coupled to a base station 115. However, persons of ordinary skill in the art having benefit of the present disclosure should appreciate that the network controller 110 may be coupled to any number of base stations 115. The network 105, the network controller 110 and/or the base station 115 provide wireless connectivity according to one or more wireless communication protocols, such as the protocols discussed above. In embodiments that operate according to the UMTS protocol, the network 105, the network controller 110, and the one or more base stations 115 may be referred to collectively as the UMTS Terrestrial Radio Access Network (UTRAN). In various alternative embodiments, the UTRAN may also include one or more of the interfaces between the network 105, the network controllers 110, and/or the base stations 1 15.

The communication system 100 includes one or more mobile units 120 (1-3). In the interest of clarity, the indices (1-3) will be used when the mobile units 120(1-3) are referred to individually or in subsets, but the indices (1-3) may be dropped when the mobile units 120 are referred to collectively. The same convention may be applied to other numbered elements referred to below. Exemplary mobile units 120 include, but are not limited to, mobile phones 120(1), personal data assistants 120(2), smart phones (not shown), text messaging devices (not shown), laptop computers 120 (3), desktop computers (not shown), and the like. In the interest of clarity, only three mobile units 120 are shown in FIG. 1.

However, persons of ordinary skill in the art having benefit of the present disclosure should appreciate that the communication system 100 may include any number of mobile units 120 of any type.

The mobile units 120 may form one or more wireless communication links 125 with the base station 115, which may provide access to the network 105 via the network controller 110. In the illustrated embodiment, the wireless communication links 125 may include one or more uplinks and one or more downlinks. The wireless communication links 125 may also include one or more channels that may be associated with one or more radio bearers. Packet flows associated with the radio bearers may be handled according to different quality-of-service (QoS) criteria. For example, one radio bearer may use a Radio Link Control (RLC) protocol layer operating in Unacknowledged Mode (UM), providing low delay jitter at the cost of increased residual packet loss rate. For another example, another radio bearer may use a RLC protocol layer operating in Acknowledged Mode (AM), providing lower residual packet loss rates at the cost of higher delay jitter.

The packets that are transmitted between the base station 115 and the mobile units 120 over the wireless communication links 125 may have different properties and therefore should be associated with different quality-of-service criteria. For example, packets that include a voice payload, such as Real-time Transport Protocol (RTP) packets may be subject to relatively stringent delay constraints (i.e., they may be delay-intolerant) but they may be relatively tolerant to loss. For another example, packets that include control information, such as Real-time Transport Control Protocol (RTCP) packets, may be relatively delay tolerant but may be relatively sensitive to loss compared to packets that include a voice payload. Accordingly, a portion of the wireless communication system 100 may determine whether or not a packet to be transmitted over one of the wireless communication links 125 contains a voice payload or control information. In one embodiment, one or more properties of the packet, such as a packet size and/or an associated User Datagram Protocol (UDP) port number, may be used to determine whether or not the packet contains a voice payload or control information. The packet may then be routed (or mapped) to a selected radio bearer based on the determination as will be discussed in detail below.

Figure 2:
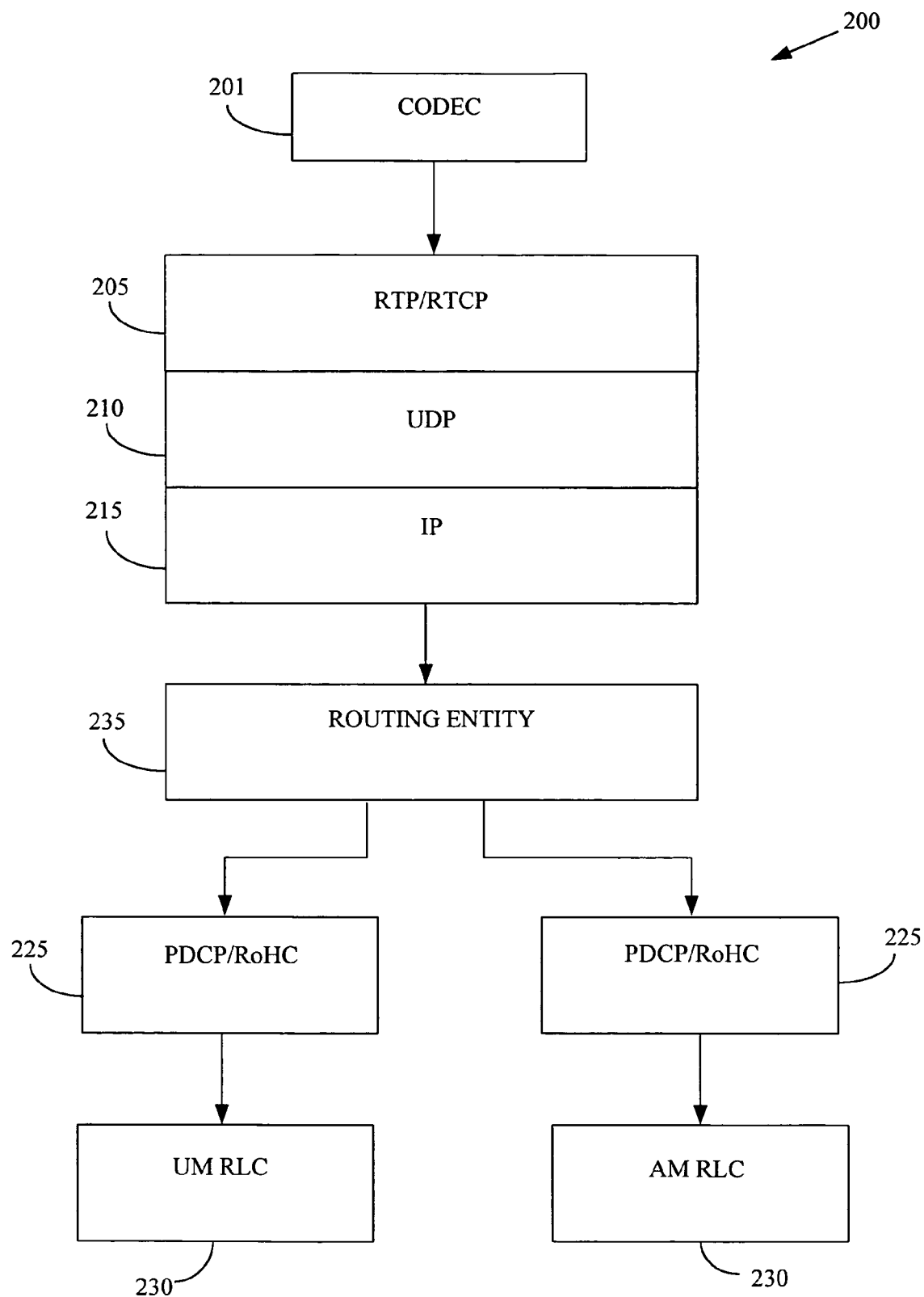
FIG. 2 conceptually illustrates one exemplary embodiment of a protocol stack, in accordance with the present invention.

FIG. 2 conceptually illustrates one exemplary embodiment of a protocol stack 200. In the illustrated embodiment, the protocol stack 200 includes a coder/decoder (codec) 201, a Real-time Transport Protocol (RTP)/Real-time Transport Control Protocol (RTCP) layer 205, a User Datagram Protocol (UDP) layer 210, an Internet Protocol (IP) layer 215, a Packet Data Convergence Protocol (PDCP) layer 225, and a Radio Link Control (RLC) protocol layer 230. In alternative embodiments, the RTP/RTCP layer 205 may be implemented as part of another protocol layer, an application, or a transcoding entity rather than as a separate layer. Operation and/or implementation of the layers 201, 205, 210, 215, 225, 230 are known to persons of ordinary skill in the art and, in the interest of clarity, only those portions of the operation and/or implementation of the layers 201, 205, 210, 215, 225, 230 that are relevant to the present invention will be discussed herein. Moreover, persons of ordinary skill in the art having benefit of the present disclosure should appreciate that the protocol stack 200 is merely one exemplary stack that may be used in a UMTS communication system. However, in alternative embodiments, other protocol stacks and/or other communication protocols may be used.

The codec 201 may provide information to the RTP/RTCP layer 205. In one embodiment, the information provided by the codec 201 may include encoded speech or other acoustic information. For example, the codec 201 may be a voice coder/decoder that encodes speech information according to an Advanced Multi-Rate (AMR) scheme. The RTP/RTCP layer 205 may encapsulate the encoded information into RTP packets, and may add control information by means of RTCP packets. Both RTP and RTCP packets may be carried by use of the UDP layer 210, and the IP layer 215. The sizes of the packets formed by the codec 201 may depend upon the coding scheme as well as upon whether the packet includes speech information or silence information. For example, during periods where the voice coding/decoding scheme has not changed, the AMR scheme produces packets of two different sizes for speech related information. Packets including an AMR voice payload include a voice frame having a selected number of bytes and a 60-byte RTP/UDP/IPv6 header. Packets containing information indicating a silent period include an AMR SID (silence frame) payload having a selected number of bytes and a 60-byte RTP/UDP/IPv6 header. The RTP payload sizes [in bits] for different AMR coding/decoding rates are listed in Table 1. In one embodiment, the size of packets including an AMR SID (silence frame) payload may be independent of the AMR coding/decoding rate.

TABLE 1

| FRAME TYPE | FRAME CONTENT | CLASS A | CLASS B | CLASS C | TOTAL SIZE |
|---|---|---|---|---|---|
| 0 | AMR, 4.75 KBPS | 42 | 53 | 0 | 112 |
| 1 | AMR, 5.15 KBPS | 49 | 54 | 0 | 120 |
| 2 | AMR, 5.90 KBPS | 55 | 63 | 0 | 128 |
| 3 | AMR, 6.70 KBPS (PDC-EFR) | 58 | 76 | 0 | 144 |
| 4 | AMR, 7.40 KBPS (TDMA-EFR) | 61 | 87 | 0 | 160 |
| 5 | AMR, 7.95 KBPS | 75 | 84 | 0 | 176 |
| 6 | AMR, 10.2 KBPS | 65 | 99 | 40 | 216 |
| 7 | AMR, 12.2 KBPS (GSM-EFR) | 81 | 103 | 60 | 256 |
| 8 | AMR SID | 39 | 0 | 0 | 56 |

Packets that include RTCP control information may be substantially larger than packets that include RTP speech related information. For example, the size of an RTCP packet that includes control information may be many times the size of an RTP packet including a voice payload. Typical RTCP packet sizes may range from about 100 bytes to about 1000 bytes or more.

The IP packets may be provided to a routing entity 235, which may be implemented either in or above the PDCP layer 225. The routing entity 235 may determine whether the packets include a voice payload or control information using one or more properties of the packet. In one embodiment, the routing entity 235 determines whether the packets include a voice payload or control information based on the size of the packet(s). For example, when the packets are encoded according to AMR at 12.2 kilobits per second, packets including a voice payload, such as RTP packets, arrive periodically at the routing entity 235 with a period of appoximately 20 ms. The arriving packets may be one of two sizes when they contain voice information: packets including voice frames will be 92 bytes in size (32 bytes of 12.2 kbps AMR RTP payload plus a 60-byte RTPIUDP/IPv6 header) and packets including silence information, such as AMR SID frames, have a packet size of 67 bytes (7 bytes of AMR SID RTP payload plus a 60-byte RTP/UDP/IPv6 header). Packets that contain control information may be much larger, as discussed above. Accordingly, arriving packets that have a packet size corresponding to the two sizes associated with voice information may be identified as packets containing voice information. Arriving packets that have a larger packet size, e.g. packet sizes above a selected threshold value, may be identified as packets containing control information.

In some embodiments, the coding/decoding scheme may be changed during a transmission. For example, the codec 201 may initially use a data transfer rate of 12.2 kilobits per second. The codec 201 may then change to a different data transfer rate, such as 4.75 kilobits per second. Changing the coding/decoding scheme may result in changes in the packet size is associated with voice payloads and/or control information. Some exemplary RTP payload sizes [in bits] associated with different coding/decoding schemes are shown in Table 1. The routing entity 235 may therefore be able to associate the sizes of received packets with packets containing voice payloads and/or packets containing control information. In one embodiment, the routing entity 235 accesses information indicating the sizes of one or more previously received packets and determines the packet size is associated with voice payloads and/or control information based upon the sizes of the one or more previously received packets. For example, the routing entity 235 may determine the packet size associated with a voice payload, the packet size associated with an SID payload, and/or a packet size threshold associated with control information using a statistical analysis of the received packet sizes and/or the arrival frequency of the packets.

The routing entity 235 may also monitor UDP port numbers associated with the packets. In one embodiment, the UDP port numbers associated with voice payloads (e.g., RTP packets) may be different than the UDP port numbers associated with control information (e.g., RTCP packets). The routing entity 235 may then use the sizes of the received packets and/or the frequency of arrival of the packets to identify the UDP port numbers for the voice payloads and the control information. In one embodiment, the routing entity 235 uses the identified UDP port numbers to identify packets including voice payloads and/or packets including control information. For example, the routing entity 235 may access headers of the arriving packets to identify the UDP port number assigned to the packet and thereby determine whether the package includes a voice payload or control information.

The routing entity 235 may then provide the packets to different radio bearers, which are represented by different PDCP entities 225 and RLC entities 230. The different RLC entities 230 may operate in different modes, such as Unacknowledged Mode (UM) or Acknowledged Mode (AM). In one embodiment, the IP packets are assigned to a radio bearer based on whether the packet contains a voice payload or control information. For example, packets containing a voice payload, such as packets in an RTP flow, may be provided to an Unacknowledged Mode (UM) RLC radio bearer 235, which may provide relatively low delay jitter at the cost of increased residual packet loss rate. For another example, packets containing control information, such as packets in an RTCP flow, may be provided to an Acknowledged Mode (AM) RLC radio bearer 240, which may provide lower residual packet loss rates at the cost of higher delay jitter. The PDCP entities 225 may include compression schemes such as Robust Header Compression (RoHC), which may compress the packets for transmission.

Figure 3:
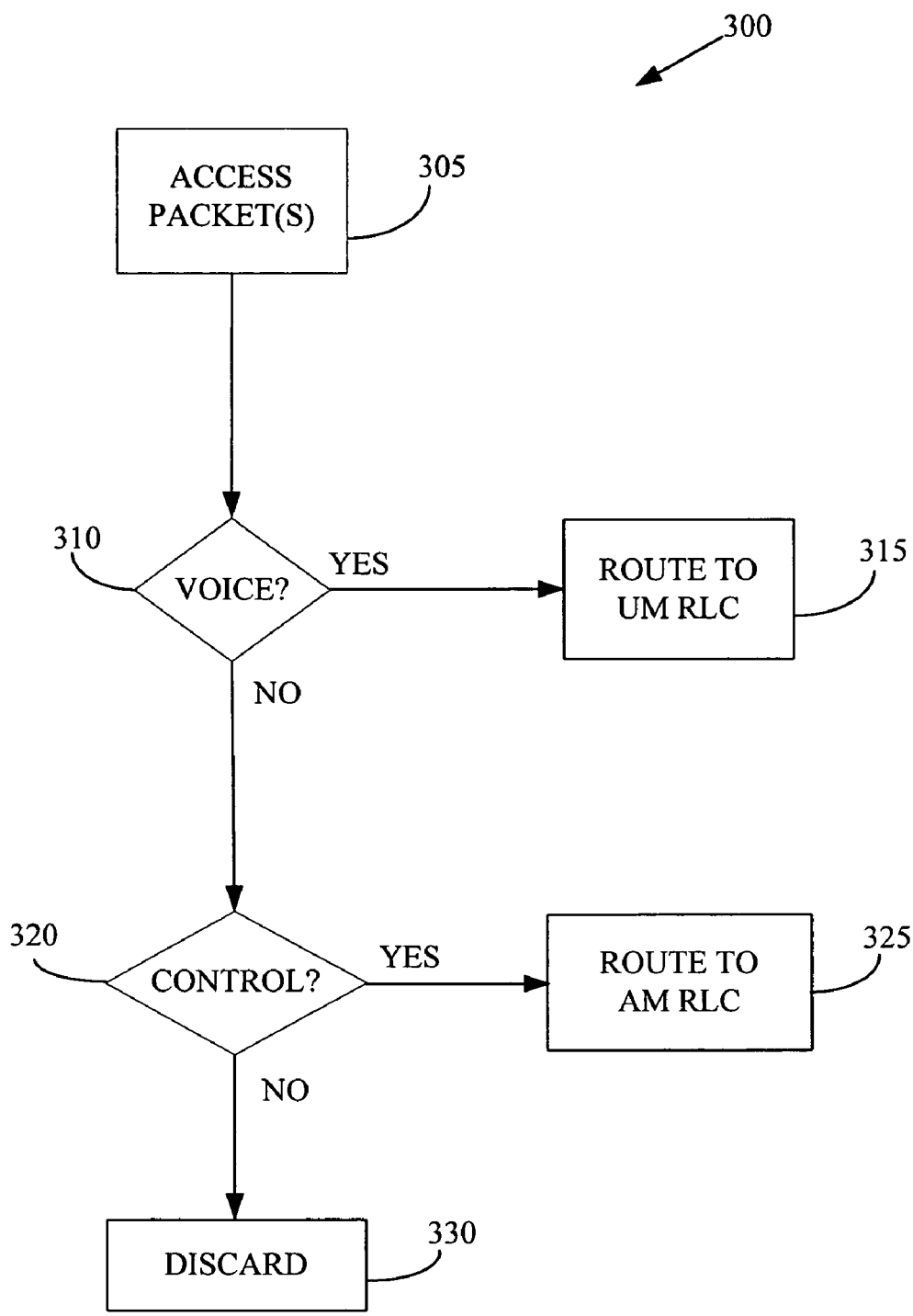
FIG. 3 conceptually illustrates one exemplary embodiment of a method for routing data packets, in accordance with the present invention.

FIG. 3 conceptually illustrates one exemplary embodiment of a method 300 for routing data packets. In the illustrated embodiment, one or more packets are accessed (at 305). Accessing the packets may include receiving the packets from another location, accessing packets stored in a buffer or other memory, as well as accessing portions of the packets such as a packet header. Whether or not the accessed packets include a voice payload is then determined (at 310). For example, a packet size mask may be determined by determining a most frequent packet size or a plurality of relatively frequent packet sizes. In one embodiment, packets including voice payloads may be identified (at 310) by comparing the packet size to a packet size associated with packets including a voice payload and/or packets including a payload indicative of a silent period, as discussed in detail above. For example, packets including a voice payload may be identified (at 320) using a packet size mask. Alternatively, packets including voice payloads may be identified (at 310) by comparing a UDP port number indicated in the packet header to a UDP port number associated with packets including voice payloads. If the packet includes a voice payload, then the packet may be routed (at 315) to an appropriate radio bearer, such as an Unacknowledged Mode RLC radio bearer.

If the packet does not include a voice payload, then whether or not the accessed packets include control information may be determined (at 320). In one embodiment, packets including control information may be identified (at 320) by comparing the packet size to a packet size (or packet size threshold) associated with packets including control information, as discussed in detail above. For example, packets including control information may be identified (at 320) using a packet size mask. Alternatively, packets including control information may be identified (at 320) by comparing a UDP port number indicated in the packet header to a UDP port number associated with packets including control information. If the packet includes control information, then the packet may be routed (at 325) to an appropriate radio bearer, such as an Acknowledged Mode RLC radio bearer. If the packet does not include a voice payload or control information, the packet may be discarded (at 330).

Figure 4:
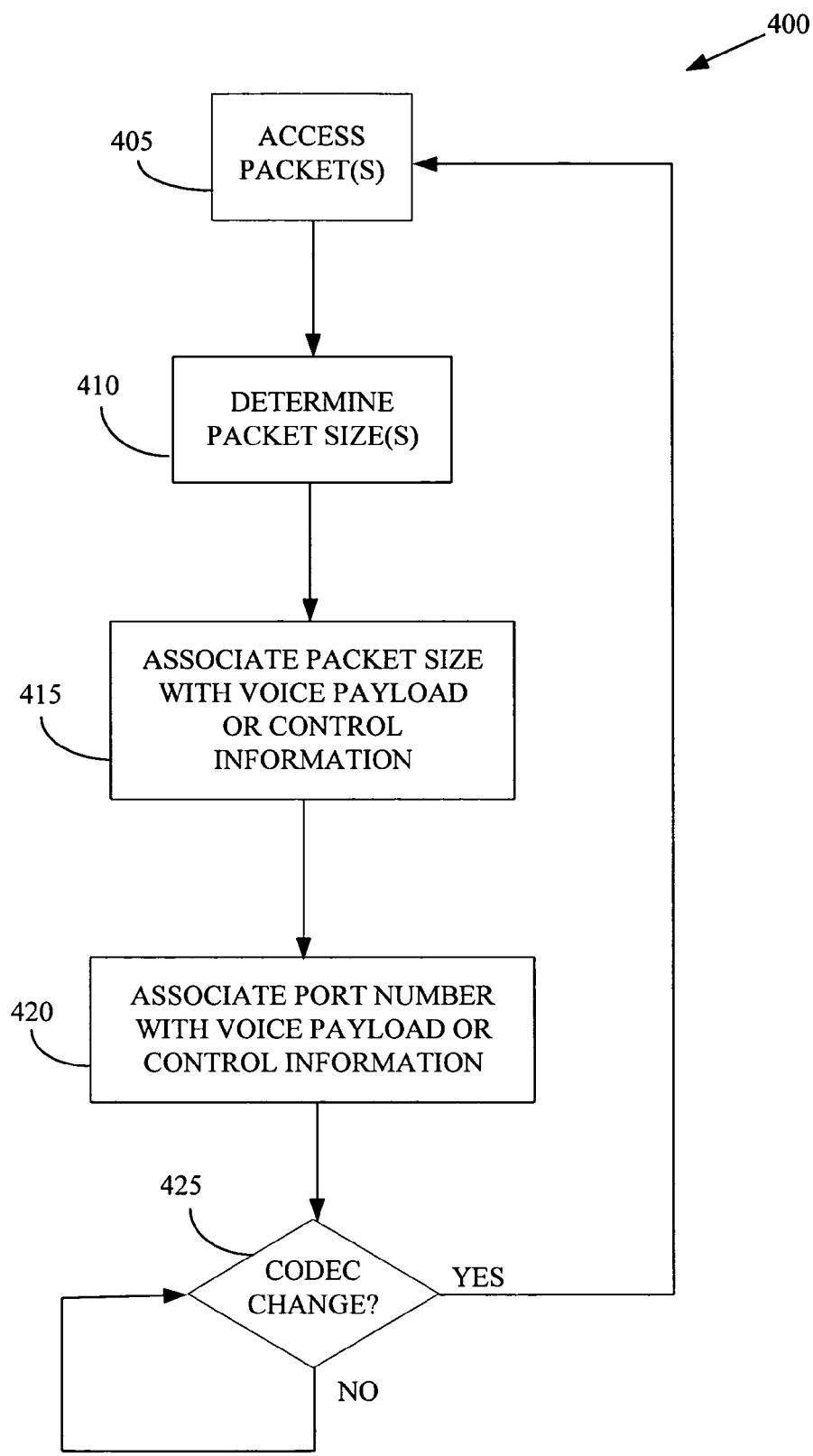
FIG. 4 conceptually illustrates one exemplary embodiment of a method of associating packets including a voice payload or control information with a property of the packet, in accordance with the present invention.

FIG. 4 conceptually illustrates one exemplary embodiment of a method 400 of associating packets including a voice payload or control information with a property of the packet. In the illustrated embodiment, one or more packets may be accessed (at 405). For example, one or more previously received packets may be accessed (at 405). Alternatively, information associated with the one or more previously received packets may be accessed (at 405). For example, packet sizes associated with one or more packets may be stored in a buffer or memory and then accessed (at 405) from the buffer or memory. Packet sizes of the accessed packets may then be determined (at 410) based on the accessed packets or information associated with one or more of the accessed packets. One or more of the packet sizes may then be associated (at 415) with packets including a voice payload and/or packets including control information, as discussed in detail above. In one embodiment, one or more port numbers, such as UDP port numbers, may be associated (at 420) with packets including a voice payload and/or packets including control information, as discussed in detail above.

The state of a coder/decoder may also be monitored. If the state of the coder/decoder changes (at 425), then packets may be accessed (at 405) and used to associate (at 415 and/or 420) one or more packet sizes and/or port numbers with voice payloads and/or control information. In one embodiment, no action may be taken as long as the state of the coder/decoder does not change (at 425). However, in alternative embodiments, additional packets may be continuously or periodically accessed (at 405) and used to associate (at 415 and/or 420) one or more packet sizes and/or port numbers with voice payloads and/or control information. For example, each received packet may be accessed (at 405) and used to associate (at 415 and/or 420) one or more packet sizes and/or port numbers with voice payloads and/or control information to improve the statistical significance of the association of the packet sizes and/or port numbers with voice payloads and/or control information.

Embodiments of the techniques described above for distinguishing between packets including voice payloads and packets including control information may provide a number of advantages over conventional practice. For example, RTP packets may be reliably distinguished from RTCP packets so that they may be routed to radio bearers that are configured appropriately for the two types of packets. Accordingly, VoIP applications may be handled more efficiently in the UTRAN. Moreover, the techniques described above may not be affected by ciphering from higher layers. Assigning packets to the appropriate radio bearers in the manner described above may also reduce uplink and/or downlink interference, so that scarce uplink and/or downlink radio resources may be conserved. For example, radio bears having a relatively lower data rate may be allocated using the proposed method. Consequently, uplink channel element allocation deficiency may be much higher than for techniques that attempt to predict the channel element allocation for a higher data rate. Embodiments that utilize UDP port numbers to identify the packets including voice payloads and control information may also increase the reliability of the call flow differentiation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication, comprising:
   receiving an Internet protocol (IP) packet including at least one of a voice payload encoded according to a real-time transport protocol (RTP) or control information encoded according to a real-time transport control protocol (RTCP);
   determining whether the IP packet includes a voice payload or control information based on at least one of a packet size and an arrival frequency of at least one IP packet; and
   routing the IP packet to a first radio bearer when the IP packet includes a voice payload and a second radio bearer when the IP packet includes control information; and
   determining a packet size mask based on at least two previous IP packets.

2. The method of claim 1, wherein determining whether the IP packet includes a voice payload or control information comprises determining whether the IP packet is encoded according to the Real Time Protocol or the Real Time Control Protocol.

3. The method of claim 1, wherein determining the packet size mask comprises determining a most frequent packet size based on at least one previous IP packet.

4. The method of claim 1, wherein determining whether the IP packet includes a voice payload or control information comprises determining whether the IP packet includes a voice payload or control information based on the packet size mask.

5. The method of claim 1, comprising determining a port number associated with the IP packet.

6. The method of claim 5, wherein determining whether the IP packet includes a voice payload or control information comprises determining whether the IP packet includes a voice payload or control information based on the port number.

7. The method of claim 6, comprising determining at least one voice payload port number associated with at least one previous IP packet that includes a voice payload.

8. The method of claim 7, comprising determining at least one control information port number associated with at least one previous IP packet that includes control information.

9. The method of claim 8, wherein determining whether the IP packet includes a voice payload or control information comprises comparing the port number associated with the IP packet with at least one of the at least one voice payload port number and the at least one control information port number.

10. The method of claim 1, wherein determining whether the IP packet includes a voice payload or control information comprises determining whether an IP packet to be transmitted over an uplink includes a voice payload or control information based on at least one of a packet size and an arrival frequency of at least one IP packet.

11. The method of claim 1, wherein determining whether the IP packet includes a voice payload or control information comprises determining whether an IP packet to be transmitted over a downlink includes a voice payload or control information based on at least one of a packet size and an arrival frequency of at least one packet.

12. The method of claim 1, comprising routing the IP packet to a radio bearer based on whether the IP packet includes a voice payload or control information.

13. The method of claim 12, comprising transmitting the IP packet over either the first radio bearer or the second radio bearer.

14. The method of claim 13, wherein transmitting the IP packet comprises transmitting the IP packet over the first radio bearer using an acknowledged mode or transmitting the IP packet over the second radio bearer using an unacknowledged mode.

* * * * *